United States Patent
Bentley et al.

(10) Patent No.: US 7,280,123 B2
(45) Date of Patent: Oct. 9, 2007

(54) DISPLAY PRIORITY FOR 2D CAD DOCUMENTS

(75) Inventors: Keith A. Bentley, Elverson, PA (US);
Gino Cortesi, Honey Brook, PA (US);
Richard Trefz, Dowingtown, PA (US)

(73) Assignee: Bentley Systems, Inc., York, PA (US)

( * ) Notice: Subject to any disclaimer, the term of this patent is extended or adjusted under 35 U.S.C. 154(b) by 543 days.

(21) Appl. No.: 10/755,412

(22) Filed: Jan. 13, 2004

(65) Prior Publication Data
US 2005/0151755 A1    Jul. 14, 2005

(51) Int. Cl.
*G09G 5/00* (2006.01)
*G06F 3/048* (2006.01)

(52) U.S. Cl. .................. 345/629; 715/964; 715/794

(58) Field of Classification Search ................ 345/637, 345/629, 639; 715/964, 794
See application file for complete search history.

(56) References Cited

U.S. PATENT DOCUMENTS

| | | | |
|---|---|---|---|
| 5,325,485 A * | 6/1994 | Hochmuth et al. | 345/505 |
| 5,454,073 A | 9/1995 | Fukushima et al. | |
| 6,075,539 A * | 6/2000 | Ishida et al. | 345/419 |
| 6,118,456 A * | 9/2000 | Cooper | 345/619 |
| 2004/0075688 A1* | 4/2004 | Cortesi et al. | 345/763 |

OTHER PUBLICATIONS http://futuretech.mirror.vuurwerk.net/z.html, *Z Buffering*, pp. 1-2, Jun. 30, 2003.

* cited by examiner

*Primary Examiner*—Kee M. Tung
*Assistant Examiner*—Michelle K Lay
(74) *Attorney, Agent, or Firm*—Venable LLP; James R. Burdett; Jeffri A. Kaminski

(57) ABSTRACT

Three values for each CAD image element are set: an element priority, a level priority, and a model reference priority. In addition, for the CAD project that contains the CAD image element, a separate priority multiplier value may be set project-wide for elements, levels, and models, creating an element priority multiplier, a level priority multiplier, and a model reference priority multiplier. Once the priority values and priority multiplier values have been set, either by default values or by the user, the values are used to calculate an image depth for each CAD image element. The image depth values are stored, for example in a z-buffer, and can be used to set the display priority for the CAD image elements regardless of the order in which they are placed into the image.

23 Claims, 3 Drawing Sheets

DISPLAY PRIORITY FOR 2D CAD DOCUMENTS

BACKGROUND OF THE INVENTION

1. Field of the Invention

The present invention relates generally to computer aided design documents, and more particularly to display ordering of elements in a two-dimensional computer aided design document.

2. Related Art

Computer-aided design (CAD) drawings prepared by architects, engineers, designers, planners, and the like require large amounts of data to be stored in files. CAD software includes an API to access the large quantities of data. Applications such as, e.g., MicroStation® products, which are developed by Bentley Systems, Inc., Exton, Pa. U.S.A. are typical of such CAD software, which may be used in the Architecture, Engineering, Construction, and Operations (AECO) marketplace.

A typical CAD project employed in the engineering context is stored in numerous files. Each file typically contains one or more engineering models, each of which typically represents an engineering domain (e.g., structural, electrical, mechanical, plumbing). Moreover, each engineering model contains numerous elements that collectively represent the complex and precise nature of each design. Each item in a model is represented by at least one element or an aggregation of elements. For example, a structural drawing can hold the column and beam layout for a floor plan, which are internally represented by lines, squares and rectangles and additional properties. In this example, an individual beam element may be a collection of lines, squares and rectangles. The structure of the floor plan may be more complex and require many levels of elements to accurately provide a structural representation.

In known CAD software, the last element added to a two dimensional design image is usually displayed on top of other existing elements. That is, the last element added obscures any previously drawn element if both elements occupy the same two-dimensional space in the image. This is commonly referred to as the painter's algorithm. As in painting, the last paint applied to a surface obscures previously applied paint. The painter's algorithm defines the overlay of the elements in the image according to the sequence in which the elements are drawn.

Many CAD and other graphics programs allow the user to reorder elements. The user may select an element and perform a "send-to-back" or "bring-to-front" process on the element. These processes reorder the sequence in which the elements are drawn. The reordering therefore changes the visibility of the element relative to the other elements in that particular image. This resequencing can either be accomplished by physically reordering the elements in memory or by keeping a separate "sort order" list.

The above approach works fine for specifying the relative order of specific elements (e.g. this one is in front of that one), but provides no systematic way for users to specify relative priorities for types or groups of elements. Also, with the painter's algorithm, maintaining proper sequencing of elements in the face of changes is difficult. For example, when making a copy of an element, there is no predictable way for the user to specify the relative priority of the new element with respect to the old element, or other elements in the same vicinity. Typically, if the user wishes to copy an element and use it elsewhere in the image or in another image, the copied element is placed at the end of the list, and therefore on top of all other elements. A reordering operation must be performed to move the element to the desired position. Similarly, if a user has a preference about a certain type of element, such as a text label, the user typically has to remember to place that element at the appropriate moment in the image construction. Otherwise the user must re-order each instance of the element type.

Furthermore, some CAD programs provide a Level (sometimes referred to as a "Layer") system whereby the image can be built from elements on a collection of Levels. For example, in an architectural drawing, the structural, electrical and plumbing disciplines might each have their own set of Levels in the image. Users can then view a limited subset of the Levels in order to reduce complexity. Since Level is typically implemented as an attribute of an Element, Level does not participate in display ordering. However, the user may wish to sort the display of Elements based on Level such that all elements on one Level appear in front of all Elements on another Level.

Accordingly, there is a need for an improved method and system for setting display priority that overcomes shortcomings of conventional solutions.

SUMMARY OF THE INVENTION

In an exemplary embodiment of the present invention a system, method and computer program product for determining a display priority in two-dimensional CAD images is disclosed.

In an exemplary embodiment of the present invention, three values for each CAD element are available: an element priority, a level priority, and a model reference priority. In addition, for the CAD project that contains the CAD image element, a separate priority multiplier value may be set project-wide for elements, levels, and model references, creating an element priority multiplier, a level priority multiplier, and a model reference priority multiplier. Once the priority values and priority multiplier values have been set, either by default values or by the user, the values are used to calculate an image depth for each CAD image element. The image depth values are used, for example in a z-buffer, and determine the relative display priority for the CAD image elements regardless of the order in which they are placed into the image.

In another embodiment of the invention, a system for setting an image depth in a two-dimensional CAD image is provided. The system includes means for setting each of an element priority multiplier value, a level priority multiplier value, and a model reference priority multiplier value for a CAD project containing at least one two dimensional CAD image, wherein the CAD image includes a plurality of CAD image elements; means for setting each of an element priority value for each CAD image element, a level priority value for each Level, and a model reference priority value for each Model Reference; means for determining an image depth for the CAD image element based on a combination of the element priority value, level priority value, model reference priority value, element priority multiplier value, level priority multiplier value, and model reference priority multiplier value; and means for using the image depth to position the CAD image element relative to other CAD image elements in the CAD image.

According to an exemplary method, element priority values for a plurality of elements are defined. The element priority values are stored as attributes of the respective elements. At least two of the elements are placed in an image. A precedence of the elements in the image is determined based on a mathematical combination of the element, level, and model reference priority values and the element, level, and model reference priority multiplier values.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DEFINITIONS

Figure 2:
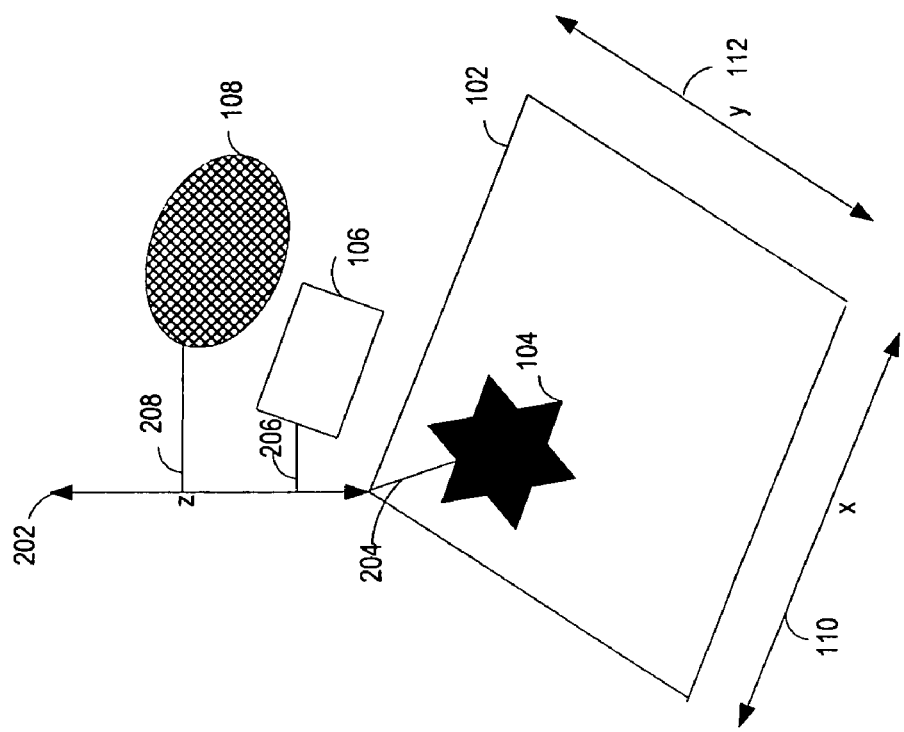
FIG. 2 depicts an exploded perspective view of the CAD image in FIG. 1.

As used herein, the following terms shall have the following meanings:

Computer: refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network. A computer can also be a personal digital assistant (PDA).

Computer-readable medium: refers to any storage device used for storing data accessible by a computer. Examples of a computer-readable medium include: a magnetic hard disk; a floppy disk; an optical disk, such as a CD-ROM, a CD-RW, and a DVD; a magnetic tape; a memory chip; and a carrier wave used to carry computer-readable electronic data, such as those used in transmitting and receiving e-mail or in accessing a network.

Input device: refers to a device, with its accompanying software drivers, used to interact with a computer system and provide input and instruction to the computer and especially to move a cursor on a display. Examples of input devices include: a computer mouse, a keyboard, a computer drawing tablet, a joystick, and a microphone.

Software: refers to prescribed rules to operate a computer. Examples of software include: software; code segments; instructions; computer programs; and programmed logic.

Computer system: refers to a system having a computer, where the computer comprises a computer-readable medium embodying software to operate the computer.

Network: refers to a number of computers and associated devices that are coupled by communication facilities. A network involves permanent connections such as cables or temporary connections such as those made through telephone or other communication links. The network is the infrastructure that allows communication and exchange of information between two or more computers. Examples of a network include: a local area network (LAN), a wide area network (WAN), Ethernet, an intranet, an internet, such as the Internet, wireless or satellite communication, and a combination of networks.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other elements and configurations can be used without parting from the spirit and scope of the invention.

An exemplary embodiment of the present invention operates on a computer system having a display and an input device, and can be part of, or cooperative with, CAD software or CAD drawing display software. The computer system can be stand-alone or networked to other computer systems. The CAD images and software can be stored on the computer readable media of the computer system or on a computer system on a network.

A display priority value may be used to determine the relative precedence of elements in a CAD image as they are displayed. The display priority value may be based on attributes of an element and other criteria. A Z-buffering approach based on the display priority value may be used to achieve relative precedence among elements in a CAD image. This approach has the advantage that it does not depend on the order in which elements are drawn. Also, groups of elements (e.g. a "level" or "layer", or "model" in CAD terminology) may have associated priority values. The element priority attributes of an element, the level priority of its level, and the model reference priority of its model reference may be combined to determine the display priority for an element. This provides additional predictable control of element display priority.

Figure 1:
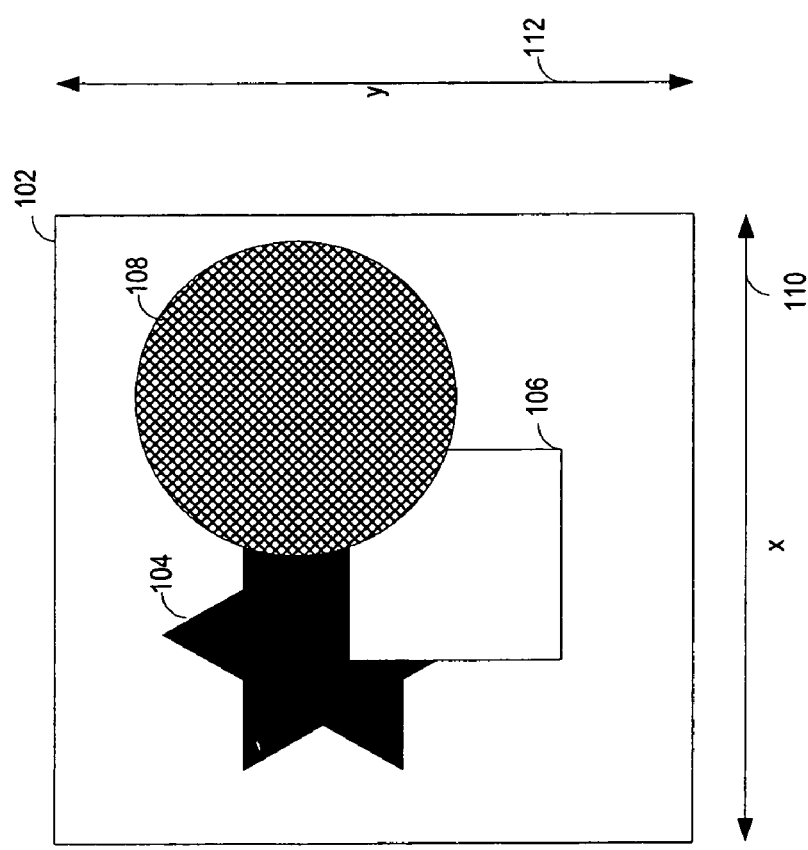
FIG. 1 depicts an exemplary embodiment of a two-dimensional CAD image according to the present invention.

FIG. 1 illustrates an exemplary embodiment of a two-dimensional CAD image 102 having three elements: a star 104, a square 106 and a circle 108. The x-axis is shown with line 110, and the y-axis is shown with line 112. It is important to note that since the image is purposely two-dimensional, there is no z-axis values stored on the elements. However, for purpose of presentation, it is desired to control the relative precedence (front-to-back positions) of the elements in the image. One approach would be to convert the elements to three-dimensions and store a z value for each element. But that has many undesirable side effects and is often unacceptable. Rather than converting the elements to three-dimensions to accomplish the relative precedence, a display priority is computed at display time for each element. The display priority may be computed based on attributes of the elements. The display priority may be computed as a mathematical function or by an algorithm implemented by a computer function. The computer function may be computer readable code, such as software.

In FIG. 1, the star 104 has the lowest computed display priority. Accordingly, the star 104 is displayed behind and obscured by both of the square 106 and circle 108. The square 106 has the next lowest computed display priority. The square 106 is therefore on top of the star 104 but beneath the circle 108. The circle 108 is the element in the drawing that has the highest computed display priority. The circle 108 is thus displayed on top of both the star 104 and square 106.

Referring now to FIG. 2, a hypothetical, stylized, exploded view of the two dimensional CAD image 102 of FIG. 1 is illustrated. FIG. 2 shows the computed display priority values along a third axis 202. The ordering of the star 104, square 106, and circle 108 along the display priority axis is also shown. The relative positions of the elements with respect to the display priority axis are shown with line 204 for the star 104, line 206 for the square 106, and line 208 for the circle 108.

As mentioned above, the element priority attributes of an element, the level priority of its level, and the model reference priority of its model reference may be combined to determine the display priority for an element. The element priority for an element can be defined by a user via an input device or set by default. The element priority is treated as an attribute of its respective element. When an element is created, its element priority is determined along with the element's other attributes, such as color, line width, etc. Defining element display priority as an attribute of an element provides the user a way to define the element display priority of an element as they are copied.

Additionally, a user can specify a priority for groups of elements. As mentioned above, a CAD image can be made up of multiple levels. A level typically includes logically related elements and can contain one or more elements. Each level may be assigned a level priority. Accordingly users can specify an order of appearance in the depth of the image for different levels.

A CAD project is typically comprised of multiple models. A model is a higher level logical grouping of content than a level (models contain levels). A model is typically used to subdivide a project into smaller, individually editable, pieces. A model can be stored in a single CAD file or, as in MicroStation V8 DGN files, a single CAD file can contain multiple models. A CAD image can be comprised of references to multiple models (sometimes called an "XREF"). In fact, the same model may be referenced more than one time at different sizes, orientations, and positions through multiple model references. Each model reference can be assigned a model reference display priority.

For every element in a CAD image, an element priority, level priority and model reference priority may be determined. These three priorities may be combined using different combining weights to determine the final display priority for an element. The element is displayed in the image according to its computed display priority and not according to the sequence in which the element is drawn. For example, in the illustration shown in FIG. 1, circle 108 may be drawn before star 104. However, since circle 108 has a higher computed display priority, it is displayed on top of star 104. Thus no matter what order the elements are draw in the image, the elements are displayed according to their computed display priority. When two elements have identical computed display priority values, generally the last one drawn appears on top, as in the painter's algorithm.

Figure 3:
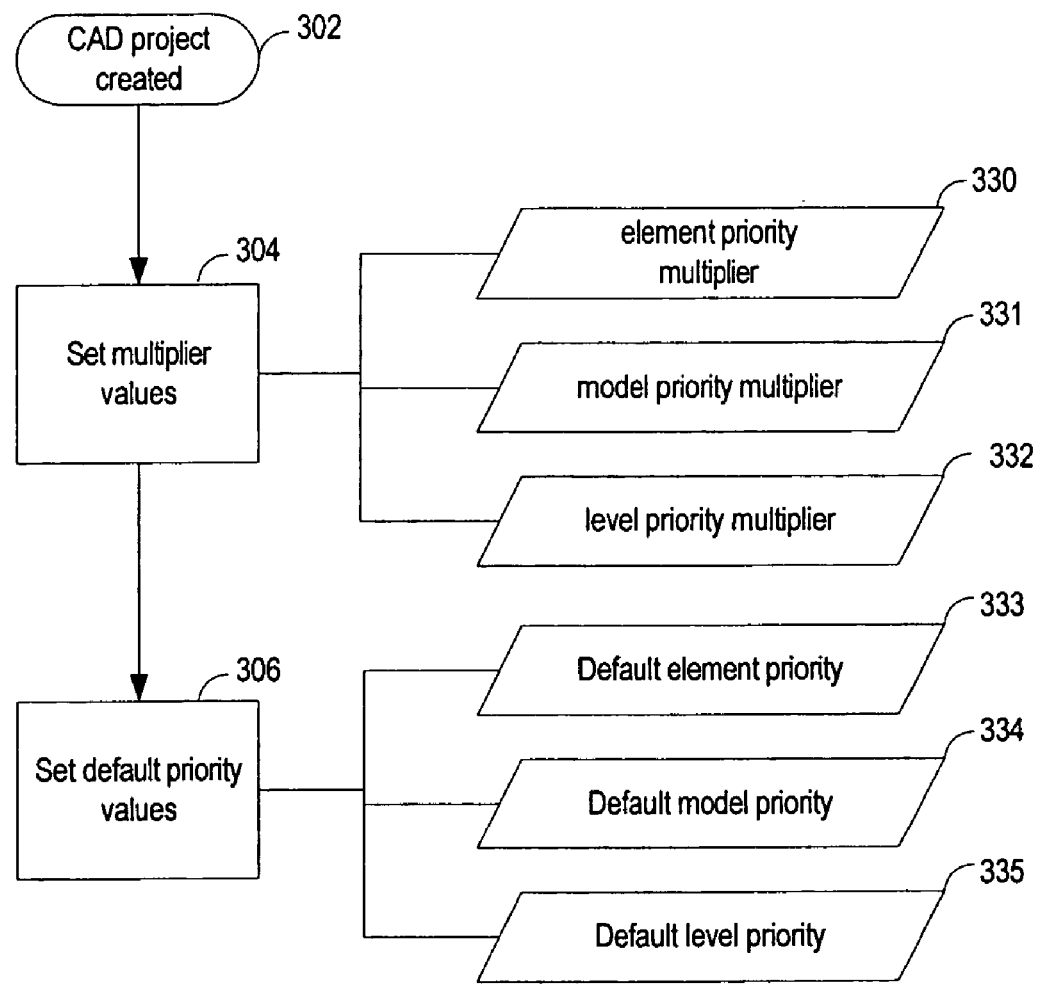
FIG. 3 depicts a flow chart of an exemplary embodiment of the method of the present invention.
Figure 4:
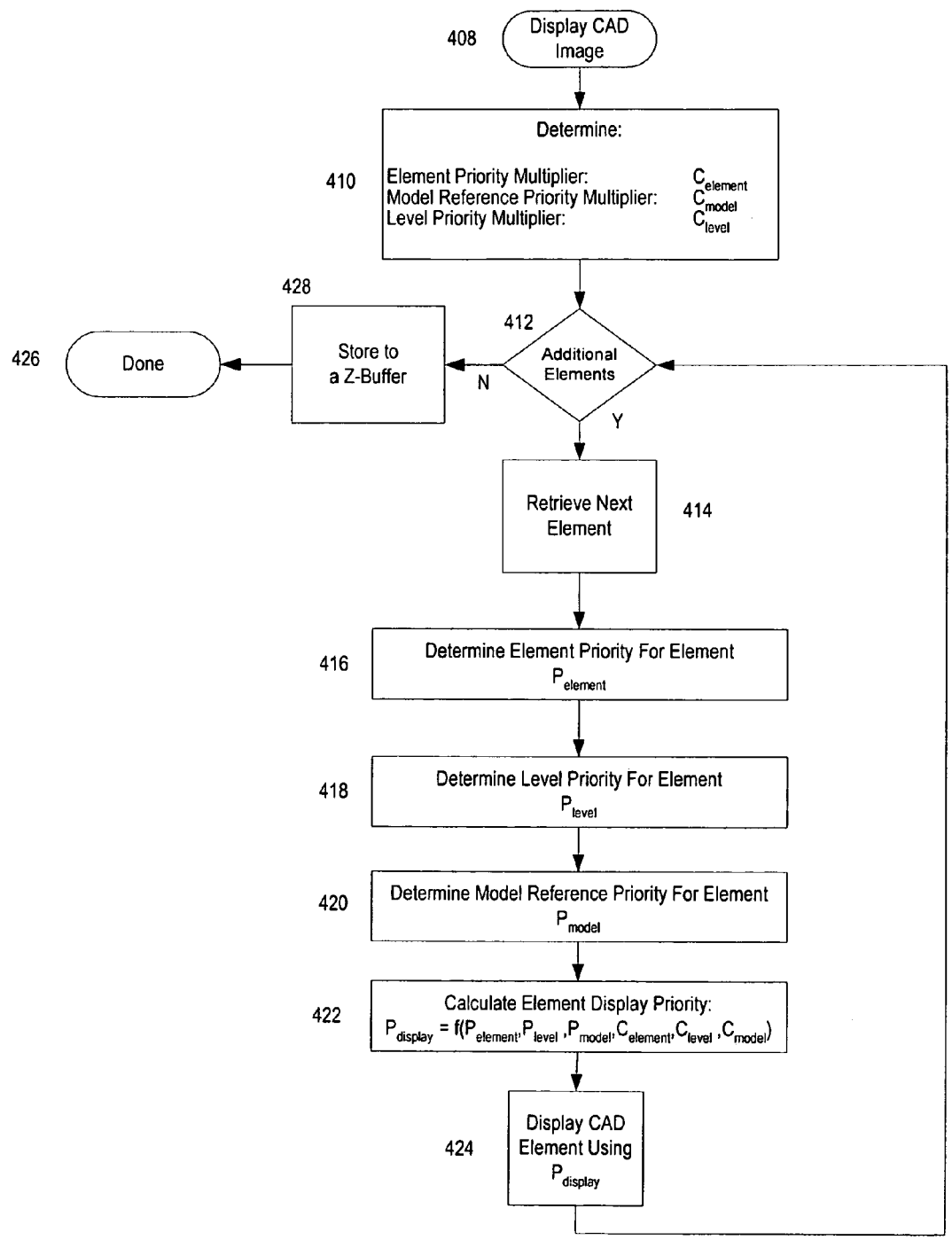
FIG. 4 depicts a flow chart of an exemplary embodiment of the method of the present invention.

FIGS. 3 and 4 depict flow charts of an exemplary embodiment of a method according to the present invention. The method determines display priorities for elements in an image based on the element priority, level priority and model reference priority described above. The display priorities for the elements may also be calculated based on other attributes of an element or its context. For example, the view type, cost, creation time, author may be used in determining display priority.

When a CAD project is created per block 302, or later on during the design stages, a combining weight, such as an element priority multiplier 330, a model reference priority multiplier 331, and a level priority multiplier 332, for each of the three priorities may set per block 304. The multipliers are constant for a CAD image and may apply to the project as a whole. The combining weight may be a constant value which is combined in some manner with its associated priority. The combining weight may be used to determine the relative influence of each of the individual priorities in determining a display priority for that element.

The multipliers 330, 331, and 332 determine the relative impact of each priority value. For example, if the user does not want to use level priority at all in determining display priority, the level priority multiplier 332 may be set to zero.

The default element priority 333, level priority 334, model reference priority 335 may also be set, block 306. These default priorities may be predefined for a project. The multipliers and the default priorities for the element, level, and model reference may by set by a project manager or administrator. Typically, the CAD image is created according to defined drafting standards. The drafting standards may be defined in a settings file in the CAD software. The administrator may set the multipliers and default priorities based on project wide rules for what is to be displayed with the highest priority. A user may also be permitted to set or modify the multipliers and priorities.

At display time, an order of precedence for the elements in a CAD image may be determined, block 408. The display priority for each element in the CAD image to be displayed may be used to determine the order of precedence. To determine the display priority for an image, first the element priority multiplier, level priority multiplier and model reference multiplier for an element are determined, block 410. The multipliers are constant for all of the elements the CAD image. The multipliers may also be constant for an entire project.

In block 412, it is determined whether there are more elements in the image for which a display priority needs to be computed. If there are elements for which a display priority needs to be computed, the process proceeds to block 414. Per block 414, the next element is retrieved from the CAD file.

The element priority for that element is determined, per block 416. As mentioned above the element priority may be an attribute of the element. Thus, the attributes of the element may be examined to determine the element priority.

In block 418, the level priority for the element is determined. The level priority depends the level of the element. The level may be an attribute of the element and can be obtained by examining the attributes of the element. Once the level of the element is determined, the level priority for that level may be determined. For example, this may be done using a mapping process that maps a level with a level priority.

A model reference priority for the element is determined, per block 420. This may be done using a mapping process that maps a model reference for the element with a model reference priority value.

The display priority for the element is then computed, block 422. The display priority may be a function of the element priority, level priority, and model reference priority. For example, the element priority multiplier 330, model reference priority multiplier 331, level priority multiplier 332, element priority 333, model reference priority 334, and level priority 335 of an element may be combined to determine a display priority for that element. In an exemplary embodiment, the display priority can be determined from the following equation:

$$P_D = (P_{element} \times c_{element}) + (P_{level} \times c_{level}) + (P_{model} \times c_{model}) \quad (1)$$

where $P_D$ is the display priority, $P_{element}$ is the element priority, $c_{element}$ is the element priority multiplier, $P_{level}$ is the level priority, $c_{level}$ is the level priority multiplier, $P_{model}$ is the model reference priority, and $c_{model}$ is the model reference priority multiplier. Generally, $P_D = f(P_{element}, P_{level}, P_{model})$. Other attributes and the context of the element may also be used in the function.

Once the display priority for the element is computed, the element can be displayed, block 424. The element is displayed in the CAD image using its display priority to order the element in the image depth. The process may then return to block 412 and may be repeated for each element in the CAD image until there are no more elements that need a display priority computed. The process is then complete, block 426.

In an exemplary embodiment, a z-buffer may be used to store the display priorities and/or the image depth of the CAD image elements, block 428. Known z-buffering techniques may be used to display the elements based on the calculated display priorities. The number of display priority levels is only limited by the size of the z-buffer. If the z-buffer is $2^{24}$ bits large, then default values for the three constants can be, for example, $c_{element}=1$, $c_{level}=256$, and $c_{model}=65536$.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method, comprising:
   determining an element priority, a level priority, and a model reference priority for at least two elements in a two-dimensional (2D) CAD image, wherein the elements are 2D;
   determining a display priority for the elements as a function of the element priority, the level priority, and the model reference priority for respective elements;
   determining an order of precedence of the elements based on their display priority; and
   displaying the elements in the CAD image based in part on the order of precedence.

2. The method of claim 1, wherein determining the display priority further comprises:
   determining an element priority multiplier, a level priority multiplier, and a model reference priority multiplier; and
   combining the element priority, the level priority, and the model reference priority with the element priority multiplier, the level priority multiplier, and the model reference priority multiplier.

3. The method of claim 1, further comprising:
   determining a level attribute for the element; and
   obtaining the level priority based on the level attribute.

4. The method of claim 1, further comprising displaying elements with higher display priorities on top of elements with lower display priorities.

5. The method of claim 1, wherein determining the display priority is based on a mathematical function.

6. The method of claim 1, further comprising receiving user input defining the element priority, level priority, and model reference priority.

7. The method of claim 1, further comprising receiving user input defining the element priority multiplier, level priority multiplier, and model reference priority multiplier.

8. A method of setting an image depth in a two-dimensional computer assisted design (CAD) image, comprising the steps of:
   determining each of an element priority multiplier value, a level priority multiplier value, and a model reference priority multiplier value for a CAD project containing at least one two-dimensional CAD image, wherein the CAD image includes a plurality of 2D CAD image elements;
   determining each of an element priority value, a level priority value, and a model reference priority value for a CAD image element;
   determining an image depth for the CAD image element based on a combination of the element priority value, level priority value, model reference priority value, element priority multiplier value, level priority multiplier value, and model reference priority multiplier value; and
   using the image depth to position the CAD image element relative to other CAD image elements in the CAD image.

9. The method of claim 8, further comprising storing the image depth for the CAD image element in a z-buffer for the CAD image.

10. The method of claim 8, further comprising:
    receiving user input on at least one of the element priority value, level priority value, model reference priority value, element priority multiplier value, level priority multiplier value, and model reference priority multiplier value.

11. The method of claim 8, further comprising: setting a default element priority multiplier value of 1, a default level priority multiplier value of $2^8$, and a default model reference priority multiplier value of $2^{16}$, wherein the z-buffer has a size of $2^{24}$ bits.

12. The method of claim 8, wherein the step of determining an image depth comprises calculating the sum of the product of the element priority value with the element priority multiplier, the product of the level priority value with the level priority multiplier, and the product of the model reference priority value with the model reference priority multiplier.

13. A system for setting an image depth in a two-dimensional computer assisted design (CAD) image, comprising:
    means for setting each of an element priority multiplier value, a level priority multiplier value, and a model reference priority multiplier value for a CAD project containing at least one two dimensional CAD image, wherein the CAD image includes a plurality of 2D CAD image elements;

means for setting each of an element priority value, a level priority value, and a model reference priority value for the CAD image element;

means for determining an image depth for the CAD image element based on a combination of the element priority value, level priority value, model reference priority value, element priority multiplier value, level priority multiplier value, and model reference priority multiplier value; and means for using the image depth to position the CAD image element relative to other CAD image elements in the CAD image.

14. The system of claim 13, further comprising means for storing the image depth for the CAD image element in a z-buffer for the CAD image.

15. The system of claim 13, further comprising:

means for receiving user input on at least one of the element priority value, level priority value, model reference priority value, element priority multiplier value, level priority multiplier value, and model reference priority multiplier value.

16. The system of claim 13, further comprising: means for setting a default element priority multiplier value of 1, a default level priority multiplier value of $2^8$, and a default model reference priority multiplier value of $2^{16}$, wherein the z-buffer has a size of $2^{24}$ bits.

17. A computer useable information storage medium storing computer readable program code for causing a computer to perform:

determining an element priority, a level priority, and a model reference priority for at least two elements in a 2D CAD image, wherein the elements are 2D;

determining a display priority for the elements as a function of the element priority, the level priority, and the model reference priority for respective elements;

determining an order of precedence of the elements based on their display priority; and displaying the elements in the CAD image based in part on the order of precedence.

18. A computer useable information storage medium of claim 17, further comprising computer readable program code for causing a computer to perform:

determining an element priority multiplier, a level priority multiplier, and a model reference priority multiplier; and combining the element priority, the level priority, and the model reference priority with the element priority multiplier, the level priority multiplier, and the model reference priority multiplier.

19. A computer useable information storage medium of claim 17, further comprising computer readable program code for causing a computer to perform:

determining a level attribute for the element; and obtaining the level priority based on the level attribute.

20. A computer useable information storage medium of claim 17, further comprising computer readable program code for causing a computer to perform:

defining an element priority that is assigned to each element; and storing the element priority as an attribute of the element.

21. A computer useable information storage medium of claim 17, further comprising computer readable program code for causing a computer to perform:

receiving user input defining at least one of the element priority, the level priority, and the model reference priority.

22. A computer useable information storage medium of claim 17, further comprising computer readable program code for causing a computer to perform:

displaying elements with higher display priorities on top of elements with lower display priorities.

23. A computer useable information storage medium of claim 17, further comprising computer readable program code for causing a computer to perform:

storing the display priority value in a z-buffer.

* * * * *